UNITED STATES PATENT OFFICE.

HENRY W. KLING, OF SYRACUSE, NEW YORK.

COMPOSITION OF MATTER FOR FIRE-KINDLING.

SPECIFICATION forming part of Letters Patent No. 469,086, dated February 16, 1892.

Application filed April 16, 1891. Serial No. 389,201. (No specimens.)

*To all whom it may concern:*

Be it known that I, HENRY W. KLING, of Syracuse, in the county of Onondaga, in the State of New York, have invented new and useful Improvements in a Composition of Matter for Fire-Kindling, of which the following is a full, clear, and exact description.

My invention relates to a composition of matter for fire-kindling purposes.

My object is to produce an inexpensive composition of matter for kindling coal or other fires cheap and of great utility.

My invention consists in the new and novel composition of matter hereinafter described, and specifically set forth in the claim hereunto annexed.

I first take as a base about eight parts of sawdust, four parts of dry pulverized resin, and one part of charcoal, and these I thoroughly mix and commingle together in substantially the proportions specified. To this base I add a liquid consisting of the following ingredients: one part of melted pitch, one part of linseed-oil, (or other vegetable oil,) two parts of melted tallow, and two parts of turpentine. The whole is then again thoroughly mixed together and placed in molds and dried into cakes of any desired form.

What I claim as my invention, and desire to secure by Letters Patent, is—

The herein-described composition for fire-kindlers, consisting of sawdust, resin, charcoal, pitch, vegetable oil, and tallow.

In witness whereof I have hereunto set my hand this 6th day of April, 1891.

HENRY W. KLING.

In presence of—
H. P. DENISON,
C. W. SMITH.